(12) United States Patent
Iwata et al.

(10) Patent No.: US 11,446,913 B2
(45) Date of Patent: Sep. 20, 2022

(54) LAMINATING APPARATUS (71) Applicant: Nikko-Materials Co., Ltd., Yokohama (JP)

(72) Inventors: Kazutoshi Iwata, Yokohama (JP); Yoshiaki Honma, Yokohama (JP); Takeshi Yamaguchi, Yokohama (JP); Taihei Matsumoto, Yokohama (JP)

(73) Assignee: NIKKO-MATERIALS CO., LTD., Kanagawa (JP)

( * ) Notice: Subject to any disclaimer, the term of this patent is extended or adjusted under 35 U.S.C. 154(b) by 0 days.

(21) Appl. No.: 17/321,686

(22) Filed: May 17, 2021

(65) Prior Publication Data

US 2021/0362480 A1 Nov. 25, 2021

(30) Foreign Application Priority Data

May 19, 2020 (JP) .............................. JP2020-087407

(51) Int. Cl.
*B32B 37/10* (2006.01)
*B29C 65/18* (2006.01)
*B32B 37/06* (2006.01)

(52) U.S. Cl.
CPC .............. *B32B 37/10* (2013.01); *B29C 65/18* (2013.01); *B32B 37/06* (2013.01)

(58) Field of Classification Search
CPC .......... B32B 37/10; B32B 37/06; B29C 65/18
See application file for complete search history.

(56) References Cited

U.S. PATENT DOCUMENTS

2009/0266492 A1\* 10/2009 Takeuchi ............. H05K 3/4632
156/583.1
2018/0162111 A1 6/2018 Iwata et al.

FOREIGN PATENT DOCUMENTS

| JP | 11-19942 | | 1/1999 |
| JP | 2002154157 A | \* | 5/2002 |
| WO | 2016/199687 | | 12/2016 |

OTHER PUBLICATIONS

JP2002154157A machine translation of description (EPO/Google) (Year: 2021).\*
ip.com Search Concept (Year: 2021).\*

\* cited by examiner

*Primary Examiner* — Cynthia L Schaller
(74) *Attorney, Agent, or Firm* — Wenderoth, Lind & Ponack, L.L.P.

(57) ABSTRACT

Provided is a laminating apparatus configured to improve the uniformity of the thickness of a laminate to be obtained to improve the yield of a product, such as a laminate. The laminating apparatus includes a pressing device including a first press block that is advanceable and retreatable, a second press block arranged to face the first press block, a first pressing rubber mounted inside the first press block, and a second pressing rubber mounted inside the second press block, the first pressing rubber and the second pressing rubber facing each other, the first pressing rubber having formed on a surface thereof facing the second pressing rubber a convex frame configured to surround a peripheral edge portion thereof.

5 Claims, 9 Drawing Sheets

RELATED ART

FIG.12B

RELATED ART

LAMINATING APPARATUS

TECHNICAL FIELD

The present disclosure relates to a laminating apparatus configured to laminate a base material and a film, and more specifically, to a laminating apparatus that can make more uniform a thickness of a laminate to be obtained by laminating a base material (e.g., a printed circuit board or a wafer) and a resin film when producing the laminate.

BACKGROUND ART

In an apparatus configured to laminate a base material having a convex portion arranged on its surface by wiring or the like and a film formed of a resin, when a variation in thickness occurs in the resultant laminate, at the time of the overlapping of these laminates in a plurality of layers, a quality failure or a redundant space occurs to make the overlapped product bulky. Accordingly, various attempts have heretofore been made to uniformize the thickness of the laminate to be obtained (e.g., WO-A1-2016/199687).

As one of such attempts, to evenly press the entire surface of the film in a step of laminating the base material and the film under a vacuum state, a pressing rubber has been pressed against the entire surface of the film.

Figure 12A:
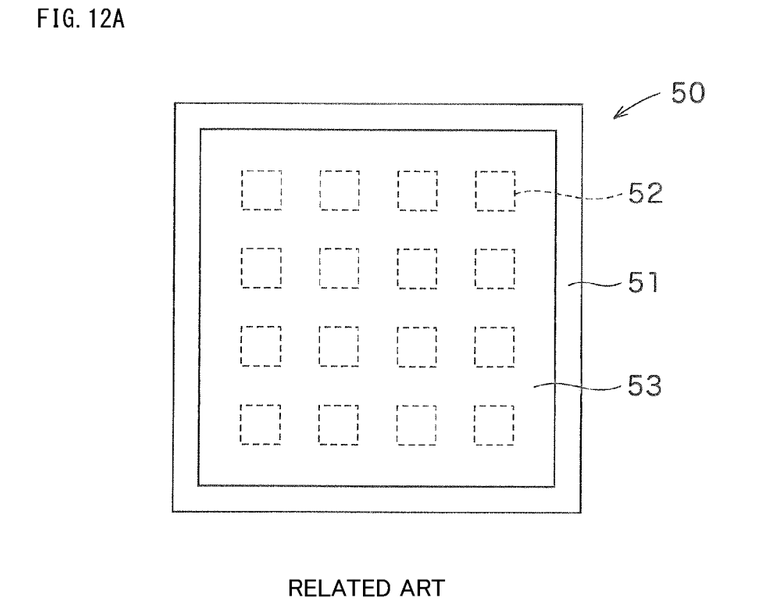
FIG. 12A is a plan view of a workpiece that is a lamination object of a related-art apparatus.
Figure 12B:
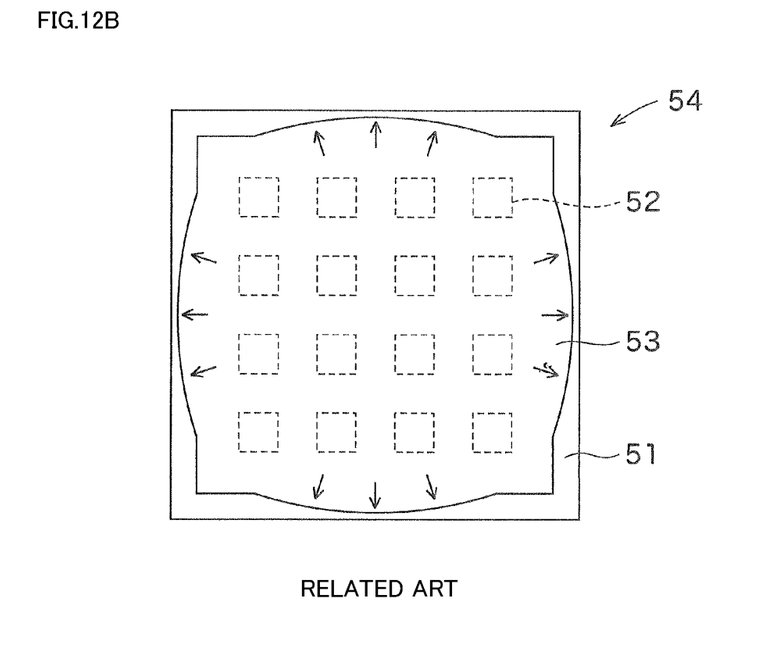
FIG. 12B is an explanatory view for illustrating the state of a laminate obtained through lamination by the related-art apparatus.

In the step, however, as illustrated in, for example, FIG. 12A, a film 53 is laminated on a base material 51 having convex portions 52 arranged on its surface (a product in which the film and the base material are superimposed under an unpressed state is sometimes referred to as "workpiece 50"). Accordingly, when the pressing rubber is uniformly pressed against the entire surface of the film 53, as illustrated in FIG. 12B, the end portions of the film 53 spread outward as indicated by arrows, and hence a laminate 54 to be obtained after the pressing may have different thicknesses at its center and end portions. When a variation in thickness of the laminate 54 to be obtained exceeds an allowable range, the laminate cannot be used as a product, thereby causing a reduction in yield of the product (laminate 54). Accordingly, a measure against the reduction has been strongly required.

SUMMARY

The present disclosure has been made in view of such circumstances, and an object of the present disclosure is to provide a laminating apparatus configured to improve the uniformity of the thickness of a laminate to be obtained to improve the yield of the product (laminate).

In order to achieve the object, the present disclosure provides the following items [1] to [5].

[1] A laminating apparatus, including a pressing device configured to press a base material and a film, the pressing device including a first press block that is advanceable and retreatable, a second press block arranged to face the first press block, a first pressing rubber mounted inside the first press block, and a second pressing rubber mounted inside the second press block, the first pressing rubber and the second pressing rubber facing each other, the first pressing rubber having a convex frame formed in a peripheral edge portion of a surface thereof facing the second pressing rubber.

[2] The laminating apparatus according to the above-mentioned item [1], wherein the second pressing rubber has a convex frame formed in a peripheral edge portion of a surface thereof facing the first pressing rubber.

[3] The laminating apparatus according to the above-mentioned item [2], wherein the convex frame of the first pressing rubber and the convex frame of the second pressing rubber are configured to be brought into abutment with each other via the base material.

[4] The laminating apparatus according to any one of the above-mentioned items [1] to [3], wherein the pressing device further includes a first heat source capable of heating the first press block.

[5] The laminating apparatus according to any one of the above-mentioned items [1] to [4], wherein the pressing device further includes a second heat source capable of heating the second press block.

That is, the inventors have made investigations with a view to solving the problem. As a result, the inventors have found that when a film formed of a resin or the like is laminated under a vacuum state in order to uniformize the thickness of the film, a convex frame (frame-like convex portion), which is formed in the peripheral edge portion of at least one of two pressing rubbers arranged to face each other so as to surround the portion, is useful for the uniformization. Thus, the inventors have reached the present disclosure.

According to the laminating apparatus according to at least one embodiment of the present disclosure, the protrusion of the film at the time of its pressing can be effectively prevented by the convex frame arranged on the pressing rubber, and hence the uniformity of the thickness of the laminate can be improved. As a result, the yield of the product (laminate) can be improved.

DESCRIPTION OF EMBODIMENTS

Embodiments of the present disclosure are hereinafter described in detail. It should be noted that the present disclosure is not limited to the following embodiments.

Figure 1:
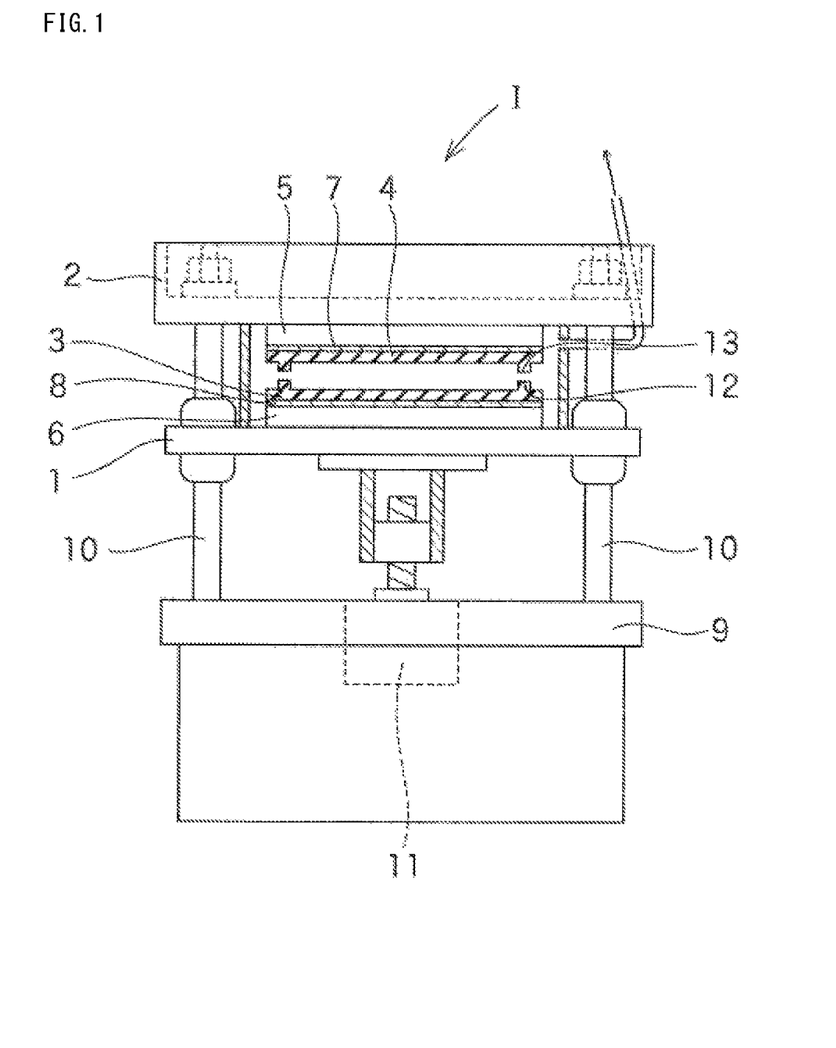
FIG. 1 is a configuration view for illustrating the outline of a laminating apparatus according to at least one embodiment of the present disclosure.

FIG. 1 is an illustration of a laminating apparatus I according to at least one embodiment of the present disclosure. The laminating apparatus I is an apparatus for laminating a base material for a build-up substrate and a film or the like formed of a resin composition, which is configured to seal various elements, wires, and the like arranged on the base material, under a vacuum state, and the apparatus includes: a lower press block 1 that is advanceable and retreatable; an upper press block 2 arranged to face the press block 1; a lower pressing rubber 3 mounted inside the lower press block 1; and an upper pressing rubber 4 mounted inside the upper press block 2. In addition, the pressing rubber 3 and the pressing rubber 4 face each other. The base material and the film or the like (see the workpiece 50 of FIG. 2) are arranged between the pressing rubber 3 and the pressing rubber 4, and the workpiece 50 is pressed with the pressing rubber 3 and the pressing rubber 4 under heating with an upper heat source 5 and a lower heat source 6 to provide a laminate in which the base material and the film are integrated with each other. A cushioning material 7 is arranged between the upper pressing rubber 4 and the heat source 5, and a cushioning material 8 is arranged between the lower pressing rubber 3 and the heat source 6.

The laminating apparatus I includes: a plurality of support columns 10 vertically arranged on a press base 9; the upper press block 2 fixed to these respective support columns 10 with bolts, nuts, and the like; and the lower press block 1 mounted to the respective support columns 10 liftably (so as to be advanceable and retreatable). A movable vacuum frame (not shown) configured to relatively move together with the press blocks 1 and 2 is arranged around the press blocks 1 and 2, and the heat sources 5 and 6. The lower press block 1 is connected to a hydraulic cylinder 11, and when the lower press block 1 is raised to a predetermined position by the operation of the hydraulic cylinder 11 (along with the ascending and descending of the hydraulic cylinder 11), a sealed space is formed inside the movable vacuum frame, and hence a pressure in the sealed space can be reduced. Accordingly, the pressing rubbers 3 and 4 are configured to be capable of pressing the workpiece 50 under a vacuum state.

Figure 2:
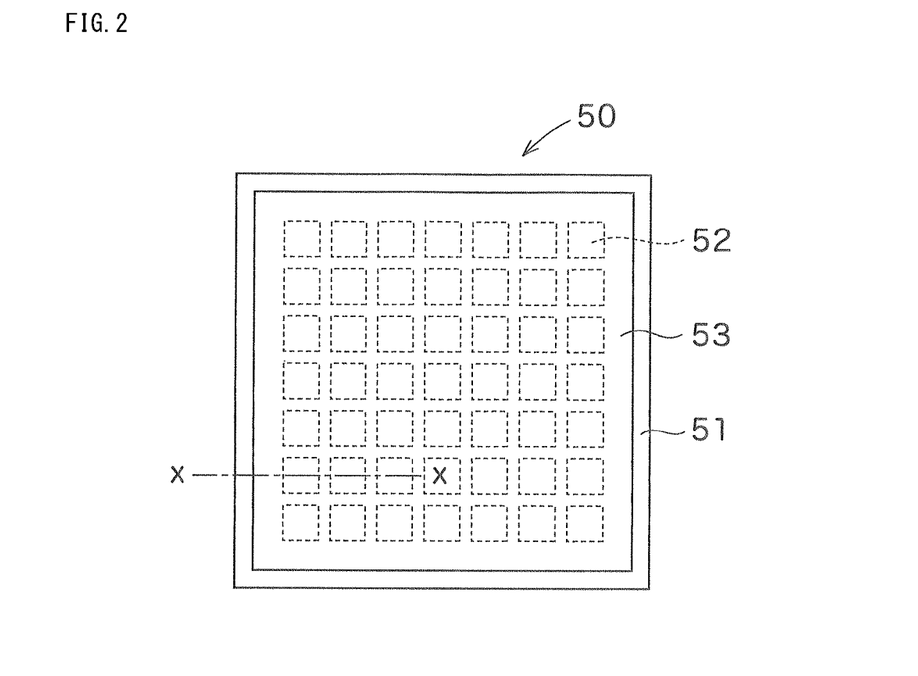
FIG. 2 is a plan view of a workpiece that is a lamination object of the laminating apparatus.
Figure 3:
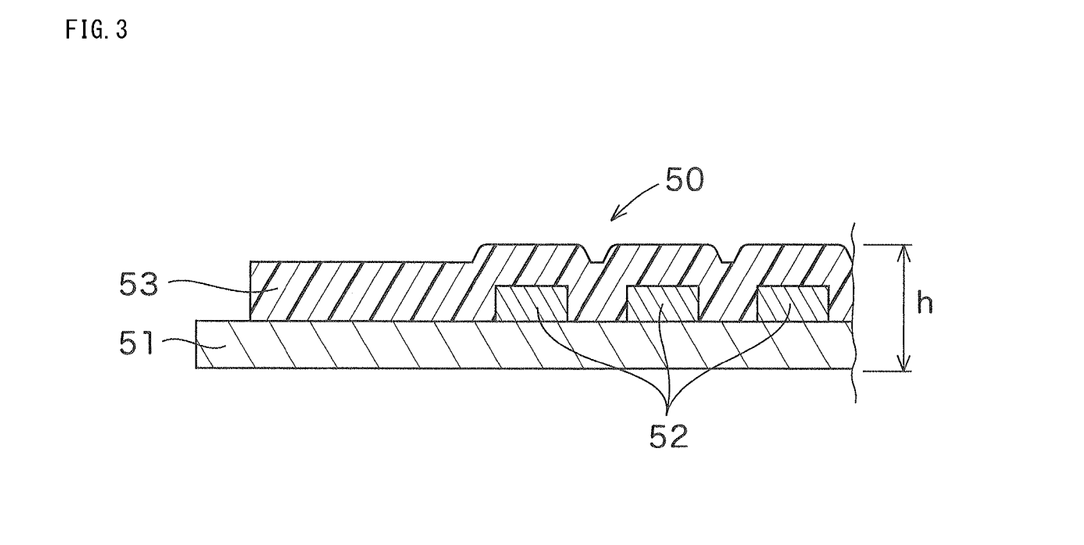
FIG. 3 is a sectional view taken along the line X-X of FIG. 2.

First, the workpiece 50 targeted by the laminating apparatus I is described. As illustrated in FIG. 2, which is a plan view, and in FIG. 3, which is a sectional view taken along the line X-X of FIG. 2, the workpiece 50 is formed from the base material 51, the convex portions 52 arranged thereon, and the film 53 formed of a resin composition for sealing, and the film is superimposed on the base material 51 and the convex portions 52 under an unpressed state.

Although the base material 51 is not particularly limited, an insulating substrate, such as a resin or a ceramic, may be used. That is, for example, a base material on which various elements, such as relatively large light-emitting elements (LEDs), can be arranged as the convex portions 52, or a base material on which a relatively small pattern of copper or the like can be formed as the convex portions 52 may be used.

Although the convex portions 52 to be formed on the base material 51 are not particularly limited, when the convex portions are convex portions each having some degree of thickness (height), such as light-emitting elements (LEDs), the effect of the present disclosure can be further exhibited. The thickness (height) of each of such convex portions 52 is 0.1 mm or more, and the upper limit thereof is typically 1.0 mm. Of course, convex portions each having a relatively small thickness (low height), such as the pattern of copper or the like, are permitted.

The film 53 is typically formed of the resin composition for sealing, and a material for the film 53 is not particularly limited. However, a film formed of a thermosetting resin composition excellent in moisture resistance and thermal shock resistance may be used, and for example, a film obtained by blending a thermosetting resin with a stabilizer, a curing agent, a dye, or a lubricant may be used. Examples of the thermosetting resin include thermosetting resins each formed of a silicone resin, a polyimide resin, an epoxy resin, or an acrylic resin. In addition, a film formed of a resin composition having excellent properties, such as adhesiveness, an insulation property, an adhesive property, and a hotmelt property, is preferably used, and an example thereof is an epoxy resin.

In addition, the thickness of the film 53 is typically from 0.01 mm to 0.3 mm. As the thickness of a film becomes larger, it has heretofore become less easy to keep the uniformity of the thickness of the film at the time of its pressing. According to at least one embodiment of the present disclosure, however, the uniformity of the thickness is excellent, and hence a relatively thick film is suitable because the effect of the present disclosure can be further exhibited. That is, the thickness of the film 53 is preferably 0.1 mm or more, more preferably from 0.1 mm to 0.20 mm. Of course, the film may have a thickness equal to or less than the ranges. The film 53 is typically formed into a size smaller than that of the base material 51.

Next, the laminating apparatus I is described (see FIG. 1). Herein, the basic configurations of the lower press block 1 and the upper press block 2 are identical to each other, and hence the lower press block 1 is described below.

Figure 4A:
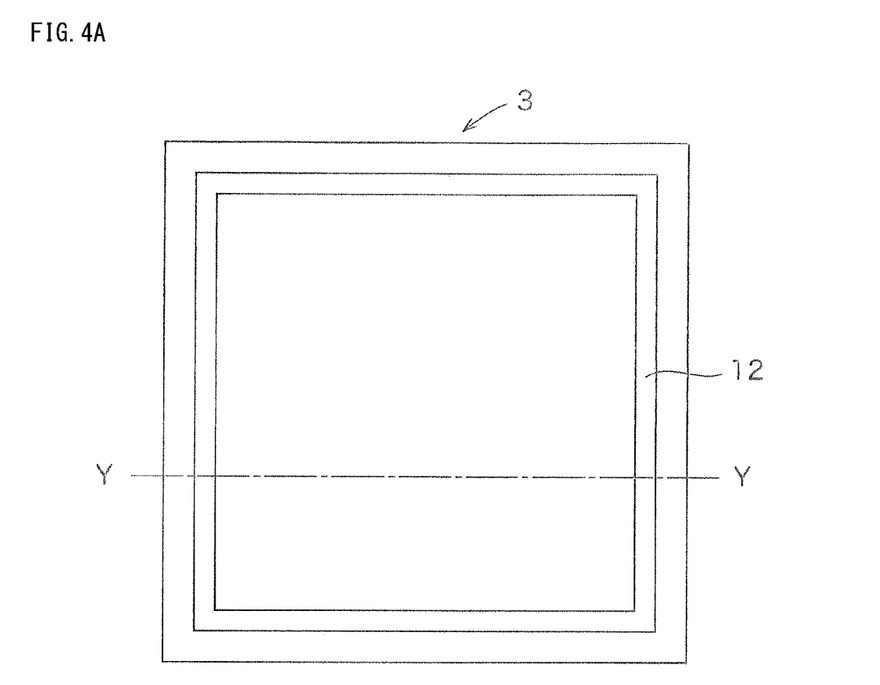
FIG. 4A is a plan view of a pressing rubber of the laminating apparatus.
Figure 4B:
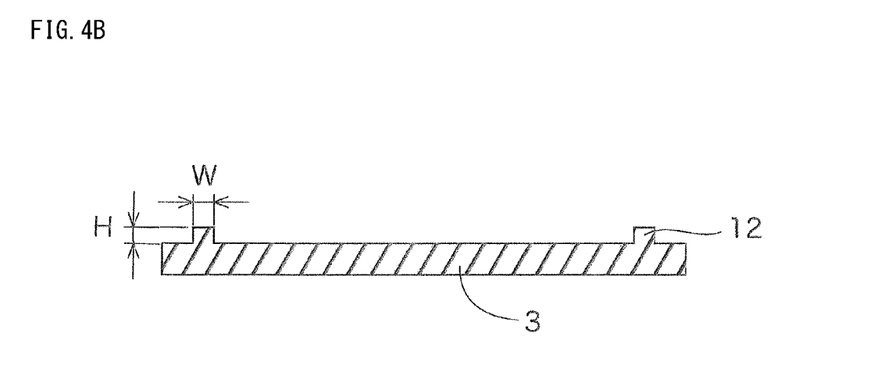
FIG. 4B is a sectional view taken along the line Y-Y thereof.

The pressing rubber 3 arranged on the lower press block 1 is brought into abutment with the workpiece 50 at the time of its pressing. In addition, as illustrated in FIG. 4A and FIG. 4B, in the pressing rubber 3, a frame-like convex portion (convex frame 12) is formed on its pressing surface (surface facing the pressing rubber 4) so as to surround the peripheral edge portion of the pressing surface.

A pressing rubber formed of, for example, a silicone rubber, a fluorine rubber, or an acrylic rubber is typically used as the pressing rubber 3 in consideration of its heat resistance and elastic strength, and a silicone rubber is preferably used. In addition, in normal cases, the convex frame 12 is integrally formed in the peripheral edge portion of the pressing rubber 3 so as to surround the portion, and hence its hardness measured with a type A durometer in conformity with JIS K 6253 is preferably from 30 to 90, more preferably from 40 to 60. That is, when the hardness is excessively high, the following tendency is observed: the convex frame 12 of the pressing rubber 3 does not deform at the time of the pressing, and hence the inner surface of the pressing rubber 3 does not reach the surface of the workpiece 50, thereby precluding firm pressing. When the hardness is excessively low, the following tendency is observed: the convex frame cannot withstand the pressure at which the film 53 protrudes, and hence cannot prevent the protrusion.

The height H of the convex frame 12 is preferably higher than the thickness "h" (see FIG. 3) of the laminate to be obtained by 0.1 mm or more, and more preferably falls within the range of from the thickness h+0.1 mm to the thickness h+0.4 mm. When the height is lower than the range, the following tendency is observed: the frame portion cannot press the film 53 at a sufficient pressure, and hence cannot withstand the pressure at which the film 53 protrudes, thereby making it impossible to prevent the protrusion. In contrast, when the height is higher than the range, the following tendency is observed: the inner surface of the pressing rubber 3 does not reach the surface of the workpiece 50, thereby precluding firm pressing. In addition, the width W of the convex frame 12 is preferably 10 mm or more in terms of balance between its strength and durability, and is more preferably 20 mm or more. The upper limit of the width W is typically 30 mm.

Figure 5:
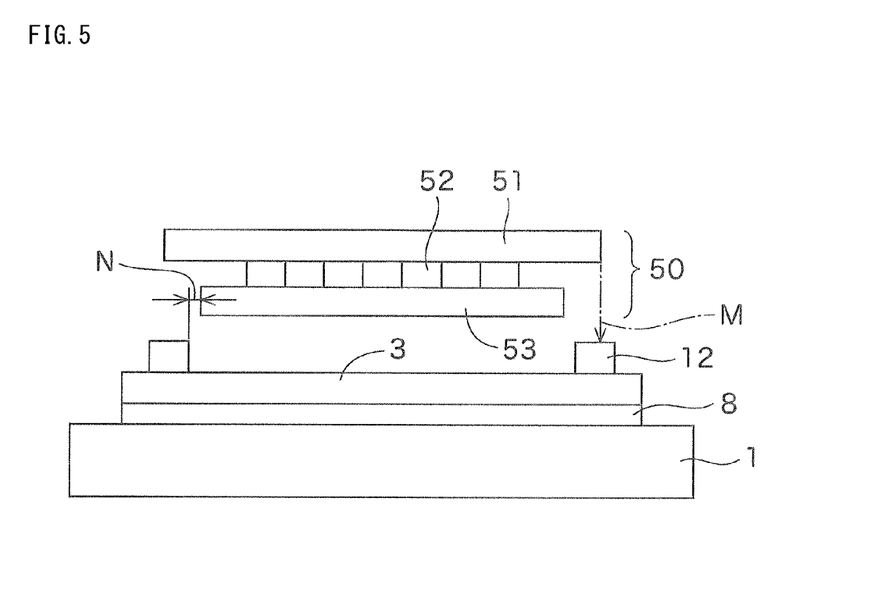
FIG. 5 is an explanatory view for illustrating a relationship between the convex frame of the pressing rubber of the laminating apparatus and the workpiece.

In addition, the convex frame 12 is preferably formed in accordance with the shape of the workpiece 50, and is more preferably formed outside the film 53 of the workpiece 50 by a length N as illustrated in FIG. 5. In normal cases, the length N is preferably 3 mm or less, more preferably 2 mm or less, though the preferred value varies depending on the thickness of the film 53 and the heights of the convex portions 52. When the length falls within these ranges, the protrusion of the film 53 at the time of its pressing can be further suppressed, and hence a laminate having satisfactory quality as a product can be obtained. In addition, to effectively prevent the protrusion of the film 53, the convex frame 12 is preferably formed so that the end portions of the base material 51 of the workpiece 50 may be positioned on its upper surface as represented by a dashed line M in FIG. 5. In FIG. 5, the illustration of the heat source 6 is omitted.

As described above, the pressing rubber 3 mounted inside the press block 1 is configured to be heated with the heat source 6 via the cushioning material 8 (see FIG. 1), and is typically pressed against the workpiece 50 under a heated state. In addition, the laminating apparatus I includes a control system (not shown) included in the heat source 6, the system being set to perform heating control. For example, a cartridge heater or a sheet heater may be used as the heat source 6.

The cushioning material 8 arranged between the pressing rubber 3 and the heat source 6 is configured to, for example, disperse a pressure applied at the time of the pressing, and a cushioning material formed of a rubber, a plastic, cloth, paper, or the like is typically used. Of those, a cushioning material formed of a rubber is preferably used because the thickness of the laminate obtained by the pressing can be made more uniform, and a silicone rubber is particularly preferably used. The cushioning material 8 may contain therein a heat-resistant resin, a glass fiber sheet, a metal foil sheet, or the like. The cushioning material preferably contains therein any such material because its durability is improved.

The thickness of the cushioning material 8 is typically from 0.1 mm to 20 mm, preferably from 0.2 mm to 10 mm, more preferably from 0.2 mm to 4 mm. The thickness of the cushioning material 8 preferably falls within these ranges because the cushioning material is excellent in elastic strength, and moreover, the deformation of its end portions can be prevented. In addition, the Shore A hardness of the surface of the cushioning material 8 is preferably 60 or more, particularly preferably from 65 to 80. The Shore A hardness is measured with a type A durometer in conformity with JIS K 6253.

Figure 6:
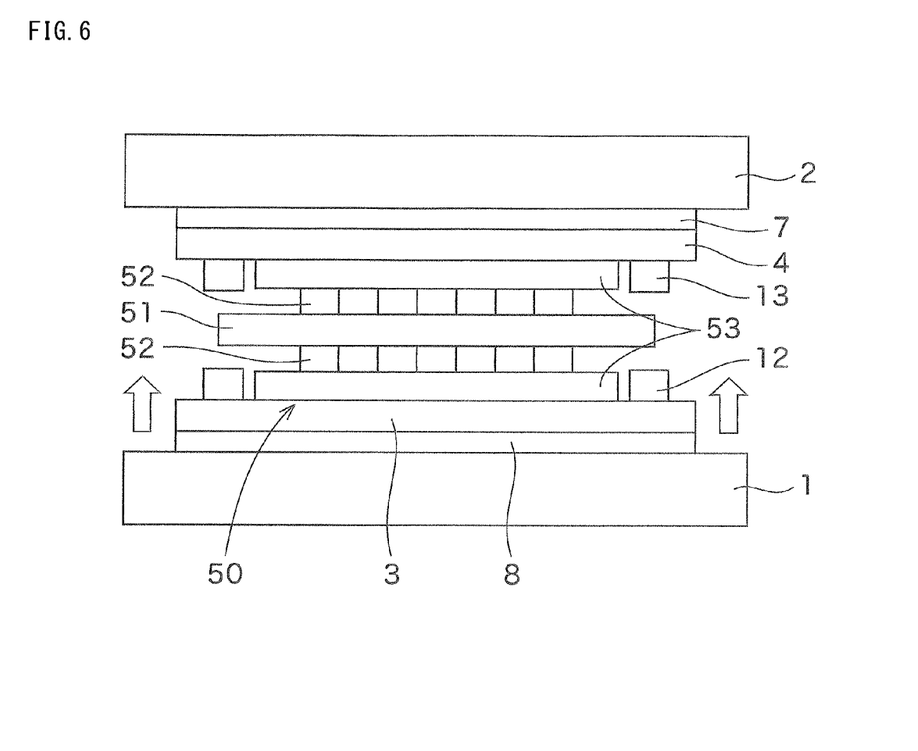
FIG. 6 is an explanatory view for illustrating the operation of pressing the workpiece by the laminating apparatus.
Figure 7:
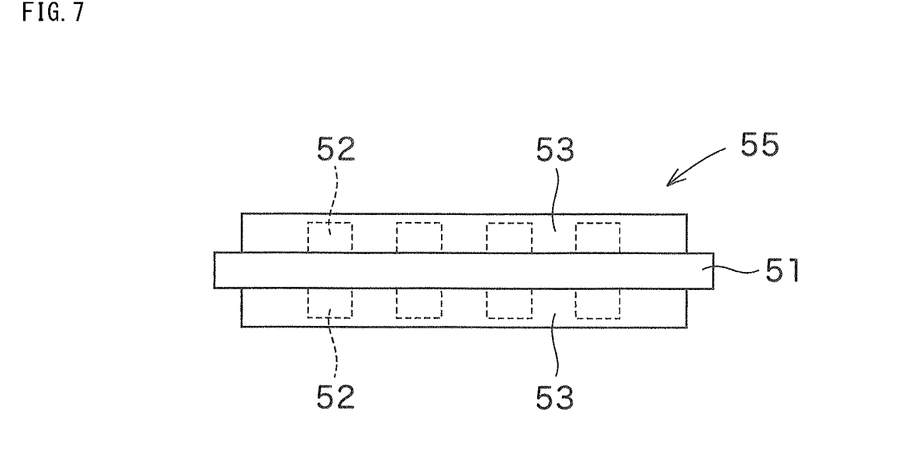
FIG. 7 is an explanatory view for illustrating the configuration of a laminate obtained by the laminating apparatus.

As described above, the upper press block 2 on the opposite side (facing side) of the press block 1 also has the same configuration. In addition, as illustrated in FIG. 6, along with the ascending of the press block 1, the workpiece 50 is pressed between the pressing rubbers 3 and 4 mounted inside the press blocks 1 and 2 under a heated and pressurized state. Thus, a target laminate 55 (see FIG. 7) can be obtained. In FIG. 6, the illustration of the heat sources 5 and 6 is omitted.

That is, according to the above-mentioned configuration, the film 53 is used as a resin composition for sealing, and hence the contamination of the workpiece in the pressing step can be prevented as compared to the case where a liquid resin composition for sealing is used. Moreover, the film 53 is easy to handle, and hence the thickness of the sealing resin layer (film 53) can be easily controlled, and a time period required for the pressing can be shortened. In addition, the end portions of the film 53 extruded to the outside by the pressing can be checked by the convex frame 12 of the pressing rubber 3, and hence the thicknesses of the central portion and end portions of the laminate 55 to be obtained can be uniformized without any need for a complicated configuration. Accordingly, the laminating apparatus according to at least one embodiment of the present disclosure can suppress a variation in thickness of the laminate 55 to be obtained to improve the yield and production efficiency of the product (laminate 55).

Pressing conditions in the pressing device of the laminating apparatus may be set, for example, as described below. Although a force at the time of the pressing of the workpiece 50 with the pressing rubbers 3 and 4 varies depending on the kind of the workpiece 50 (the base material 51 and the film 53) of interest, hydraulic pressing (the ascending operation of the hydraulic cylinder 11) is performed at a force of typically from 4 kgf/cm$^2$ to 20 kgf/cm$^2$ under a vacuum having a degree of vacuum of, for example, 2 hPa or less, and the force is preferably from kgf/cm$^2$ to 17 kgf/cm$^2$, more preferably 15 kgf/cm$^2$. The temperature of each of the heat sources 5 and 6 at this time is typically from 60° C. to 180° C., preferably from 90° C. to 130° C., though the preferred value varies depending on the kind of, for example, the film 53.

In addition, the time period for which the workpiece 50 is pressed in the pressing step is typically from 0.1 seconds to 60 minutes, preferably from 0.5 seconds to 10 minutes, more preferably from 1 second to 1 minute, though the preferred value varies depending on the kind of the workpiece 50 (the base material 51 and the film 53) of interest. When the pressing time falls within the time ranges, a balance between the uniformity of the thickness of the laminate 55 to be obtained and the production efficiency thereof becomes excellent.

In this embodiment, the convex frame 12 and a convex frame 13 are formed on both of the pressing rubbers 3 and 4, respectively. However, in, for example, the case where the workpiece 50 has the convex portions 52 formed only on one surface of the base material 51, and the film 53 is laminated only on the surface having formed thereon the convex portions 52, the convex frame (convex frame 12 or 13) only needs to be formed on the pressing rubber on the side corresponding to the surface (side on which the film is laminated).

In addition, the convex frame 12 is formed integrally with the pressing rubber 3. However, the convex frame may be formed from another member having heat resistance, an elastic strength, and the like, provided that it is preferred that the convex frame and the pressing rubber be integrally produced in terms of cost and durability.

Further, in this embodiment, the heat sources 5 and 6 are arranged for both of the lower pressing rubber 3 and the upper pressing rubber 4, respectively. However, when the film is laminated only on any one of the surfaces of the base material, the following may be performed: the heat source is arranged only for one of the lower pressing rubber 3 and the upper pressing rubber 4 to heat only one of the lower pressing rubber 3 and the upper pressing rubber 4. In addition, the heat sources 5 and 6 may not be arranged depending on the kind of the film. However, the heat sources are preferably arranged for both of the upper and lower pressing rubbers in terms of heating efficiency and the temperature control of the heat sources.

In addition, in this embodiment, the shape of each of the lower pressing rubber 3 and the upper pressing rubber 4 in plan view is designed so as to be a rectangle. However, the shape of each of the pressing rubbers 3 and 4 is not limited thereto, and may be designed so as to be a shape, such as a circular shape, an elliptical shape, or a polygon, in plan view in accordance with the shape of the workpiece 50. The shape of each of the convex frames 12 and 13 of the pressing rubbers 3 and 4 can be similarly designed in accordance with the shape of the film 53 of the workpiece 50.

In addition, the materials, thicknesses, or polishing degrees of the pressing rubber 3 arranged on the lower press block 1 and the pressing rubber 4 arranged on the upper press block 2 may be identical to or different from each other.

In addition, the cushioning material 8 arranged on the lower press block 1 and the cushioning material 7 arranged on the upper press block 2 may be formed of the same material, or may be formed of materials different from each other. Accordingly, the thicknesses of the cushioning materials 7 and 8, or the Shore A hardnesses of the surfaces thereof may be identical to or different from each other. Further, in, for example, the case where a pressure at the time of the pressing of the workpiece with the pressing rubber 3 and the pressing rubber 4 can be sufficiently dispersed, the cushioning materials may not be arranged.

Further, in this embodiment, the vertical movement (advance and retreat) of the press block 1 is performed by the operation of the hydraulic press (hydraulic cylinder 11). However, means for performing the vertical movement (advance and retreat) of the press block 1 is not limited to the hydraulic press (hydraulic cylinder 11). For example, the vertical movement may be performed by using a servomotor or an air cylinder instead of the hydraulic cylinder 11. In addition, pressing with the servo press (servomotor) can be controlled as in the hydraulic press by controlling the position of the press block 1. However, the hydraulic press (hydraulic cylinder 11) is preferably used for achieving a reduction in production cost and the downsizing of the laminating apparatus.

In addition, in this embodiment, the lower press block 1 is vertically moved (caused to advance and retreat). However, the upper press block 2 may be vertically moved (caused to advance and retreat), or both of the press blocks 1 and 2 may be vertically moved (caused to advance and retreat) by changing the position of, for example, the servomotor. However, it is preferred that only one of the press blocks vertically move (advance and retreat) because the thickness of the laminate 55 can be more strictly controlled.

Another Embodiment

Figure 8:
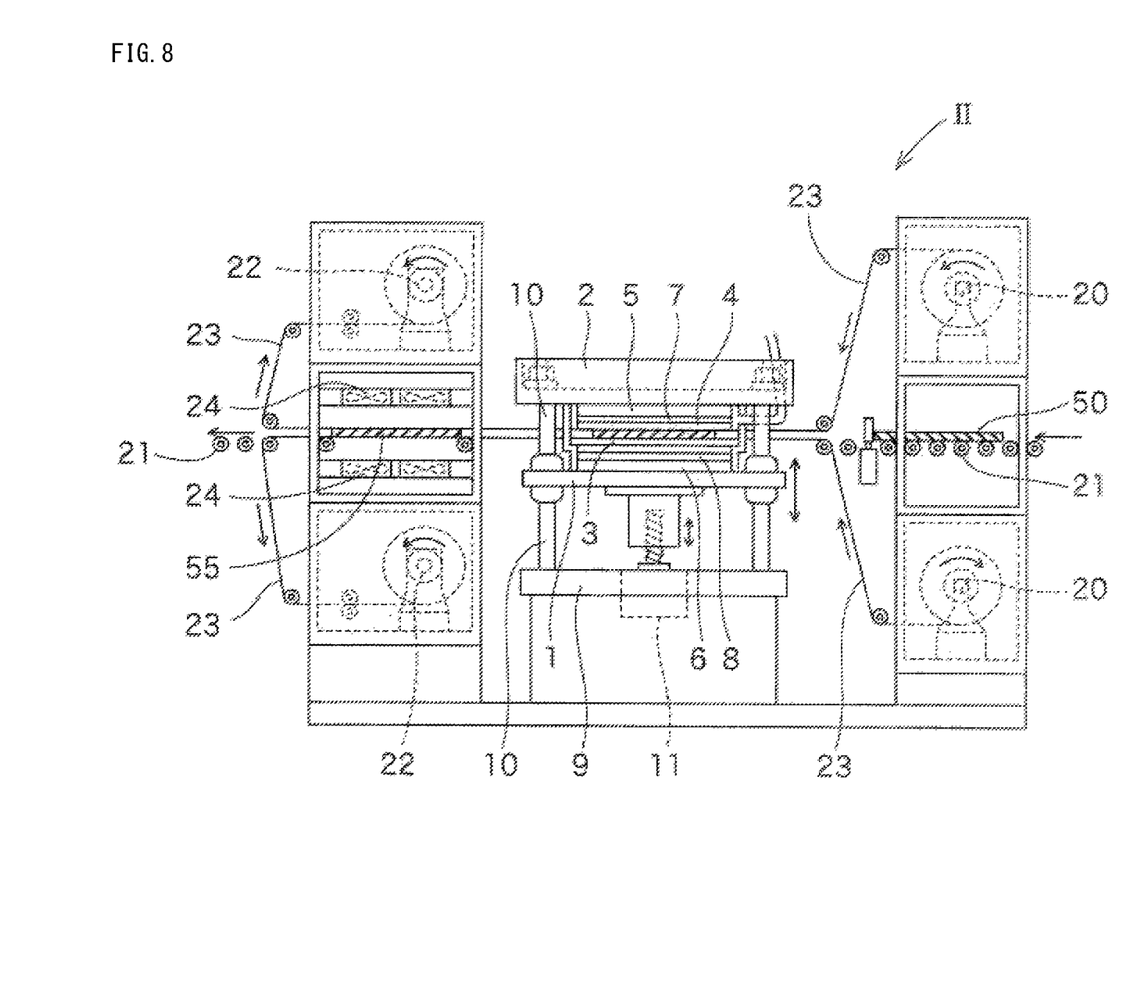
FIG. 8 is a configuration view for illustrating the outline of a laminating apparatus according to at least one embodiment of the present disclosure.

In the above-mentioned embodiment, the laminating apparatus I having arranged therein only the pressing device is described. However, the laminating apparatus according to at least one embodiment of the present disclosure may be, for example, a laminating apparatus II having arranged therein a film-conveying device configured to convey the workpiece 50 including the film to the pressing device as illustrated in FIG. 8. In FIG. 8, the illustration of the convex frames 12 and 13 to be arranged on the pressing rubbers 3 and 4 of the pressing device is omitted.

The film-conveying device includes, for example, upper and lower conveying film-feeding machines 20 positioned at the starting point of a laminating step, a carrying-in conveyor portion 21 for carrying in the workpiece 50, conveying film-winding machines 22 positioned at the end point of the laminating step, and conveying films 23 configured to convey the workpiece 50 and the laminate 55.

The workpiece 50 supplied from the carrying-in conveyor portion 21 is sandwiched and held between the upper and lower conveying films 23 fed from the film-feeding machines 20. Then, the workpiece 50 is pressed with the pressing device together with the conveying films 23 under the state of being in synchronization with the traveling of the conveying films 23 to be turned into the laminate 55, followed by the release of the holding by the conveying films 23. Thus, the laminate is removed. A cooling fan 24 in FIG. 8 is used for cooling the laminate 55.

As described above, in the laminating apparatus II according to at least one embodiment of the present disclosure, the workpieces 50 can be continuously supplied to the pressing device at predetermined intervals, and hence the laminates 55 can be efficiently produced.

Still Another Embodiment

Figure 9:
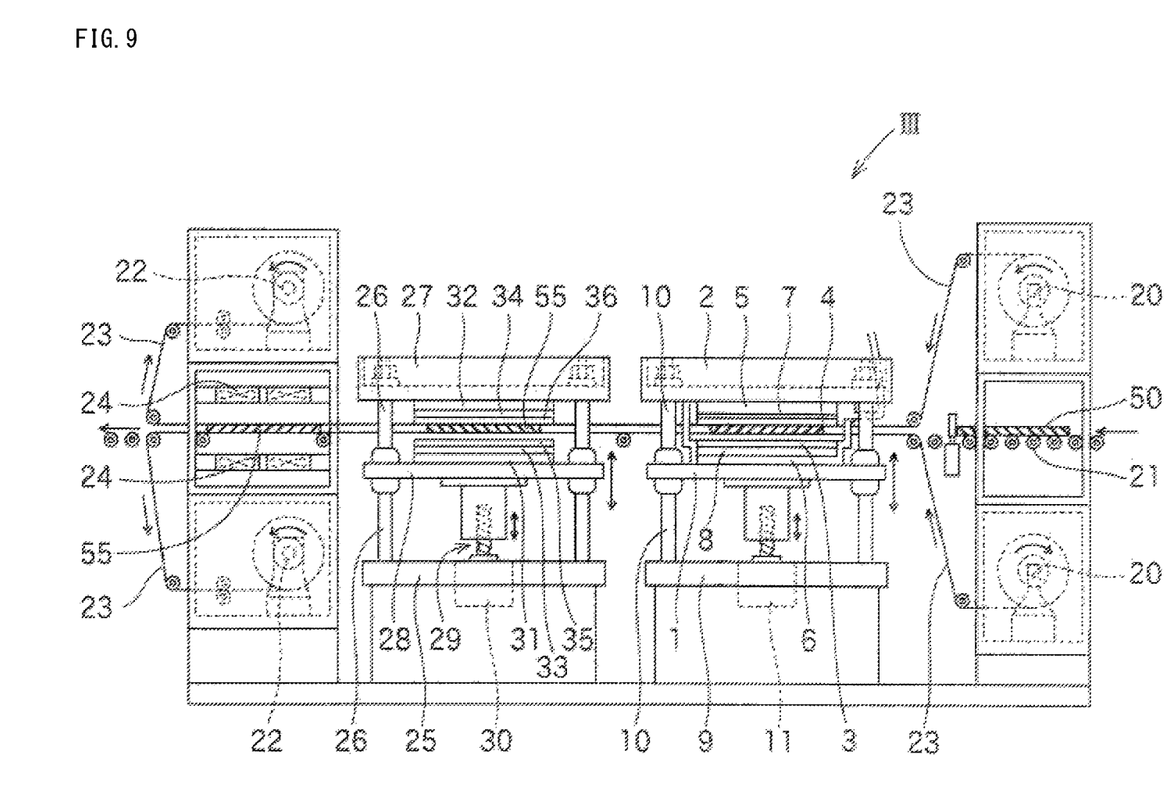
FIG. 9 is a configuration view for illustrating the outline of a laminating apparatus according to at least one embodiment of the present disclosure.

In addition, the laminating apparatus according to at least one embodiment of the present disclosure may be, for example, a laminating apparatus III in which a flat press device is further arranged downstream (in the subsequent step) of the pressing device as illustrated in FIG. 9. In FIG. 9, the illustration of the convex frames 12 and 13 to be arranged on the pressing rubbers 3 and 4 of the pressing device is omitted.

The flat press device includes, for example, a plurality of support columns 26 vertically arranged on a press base 25, an upper press block 27 fixed to these support columns 26, and a lower press block 28 mounted to the support columns 26 so as to be vertically movable (advanceable and retreatable). The lower press block 28 is connected to a servomotor 30 through a ball screw 29, and can vertically move (advance and retreat) through the operation of the servomotor 30 (along with the ascending and descending of a nut along with the rotation of a shaft in the ball screw 29).

Heaters 31 and 32 are mounted inside (press side) the upper and lower press blocks 27 and 28, respectively, and flexible metal plates 35 and 36 are arranged further inside (press side) the heaters via cushioning materials 33 and 34, respectively.

Metal plates each formed of a metal excellent in heat resistance and flexibility are typically used as the flexible metal plates 35 and 36. Examples of such metal include stainless steel, iron, aluminum, and alloys thereof. Of those, stainless steel is preferably used because of its excellent antirust property. In addition, the thickness of each of the flexible metal plates is typically from 0.1 mm to 10 mm, preferably from 1 mm to 7 mm. When the thickness of each of the flexible metal plates falls within the preferred range, the thickness of the laminate to be obtained can be made more uniform. Further, the surfaces of the flexible metal plates 35 and 36 are preferably subjected to mirror polishing because the thickness of the laminate to be obtained can be made even more uniform.

The cushioning materials 33 and 34 are each configured to, for example, disperse a pressure applied at the time of the pressing, and cushioning materials each formed of a rubber, a plastic, cloth, paper, or the like are typically used. Cushioning materials each formed of a rubber are preferably used because the thickness of the laminate obtained by the pressing can be made more uniform, and a silicone rubber is particularly preferably used. The cushioning materials 33 and 34 may each contain therein a heat-resistant resin, a glass fiber sheet, a metal foil sheet, or the like. The cushioning materials each preferably contain therein any such material because its durability is improved.

The thickness of each of the cushioning materials 33 and 34 is typically from 0.1 mm to 20 mm, preferably from 0.2 mm to 10 mm, more preferably from 0.2 mm to 4 mm. The thickness of each of the cushioning materials 33 and 34 preferably falls within these ranges because the cushioning material is excellent in elastic strength, and moreover, the deformation of its end portions can be prevented. In addition, the Shore A hardness of the surface of each of the cushioning materials 33 and 34 is preferably 60 or more, particularly preferably from 65 to 80. The Shore A hardness is measured with a type A durometer in conformity with JIS K 6253.

As described above, in the laminating apparatus III according to at least one embodiment of the present disclosure, the surface of the laminate 55 to be obtained can be made smoother, and the thickness thereof can be made more uniform because the surface is further pressed with the flat press device after its pressing with the pressing device.

EXAMPLES

An example in which the laminating apparatus according to at least one embodiment of the present disclosure is used is described together with a Comparative Example. However, the present disclosure is not limited thereto.

Example 1

Figure 10:
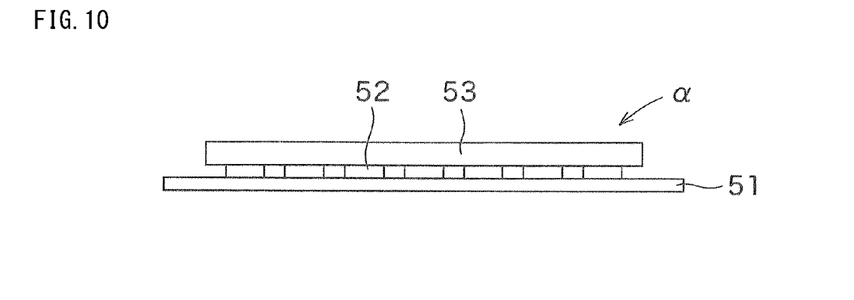
FIG. 10 is an explanatory view for illustrating the configuration of a workpiece to be used in each of the Example and Comparative Example of the present disclosure.

The lamination of a workpiece a illustrated in FIG. 10 (the base material 51, the convex portions 52, and the film 53 whose details are described below) was performed with the laminating apparatus III illustrated in FIG. 9 to produce a laminate β illustrated in FIG. 11A and FIG. 11B.

That is, first, the temperature of each of the heat sources 5 and 6 in the pressing device was set to 130° C., and the workpiece a was pressed with the pressing rubbers 3 and 4 at a force of 15 kgf/cm$^2$ for 60 seconds to provide a laminate β'.

Next, the laminate β' was pressed with the flat press device for 60 seconds while the temperature of each of the heaters 31 and 32 was set to 90° C., and a distance between the flexible metal plates 35 and 36 was set to 2.30 mm. Thus, the laminate β having a further smoothened surface was obtained.

<Pressing Device>

The pressing rubbers 3 and 4 are each formed of a silicone rubber, and each have a hardness of 60, which is measured with a type A durometer in conformity with JIS K 6253. In addition, the convex frames 12 and 13 are integrally formed at the time of the molding of the pressing rubbers 3 and 4, and each have a hardness of 60 as in the pressing rubbers 3 and 4. The convex frames 12 and 13 are each arranged so as to be brought into abutment with a position in the workpiece a outside the film 53 by 1 mm at the time of the pressing. In addition, each of the convex frames 12 and 13 is formed so that its height H and width W may be 1.5 mm and 20 mm, respectively.

<Flat Press Device>

The flexible metal plates 35 and 36 are each formed of stainless steel, and each have a thickness of 2 mm. In addition, no cushioning materials are used.

<Base Material 51>

A glass plate measuring 300 mm long by 300 mm wide by 1.1 mm thick.

<Convex Portions 52>

Silicon chips each measuring 7 mm long by 7 mm wide by 0.78 mm thick, which are aligned on the base material 51 at pitches of 10 mm (under a state in which a distance between the adjacent chips is 3 mm) in 24 columns and 24 rows (a total of 576 chips).

<Film 53>

An epoxy resin film (mold resin material) measuring 243 mm long by 243 mm wide by 0.6 mm thick.

Comparative Example 1

The base material 51, the convex portions 52, and the film 53 were pressed with the same laminating apparatus as that of Example 1 except that pressing rubbers on which the convex frames 12 and 13 were not formed were used as the pressing rubbers 3 and 4 (related-art apparatus) under the same conditions to provide a target laminate.

Figure 11A:
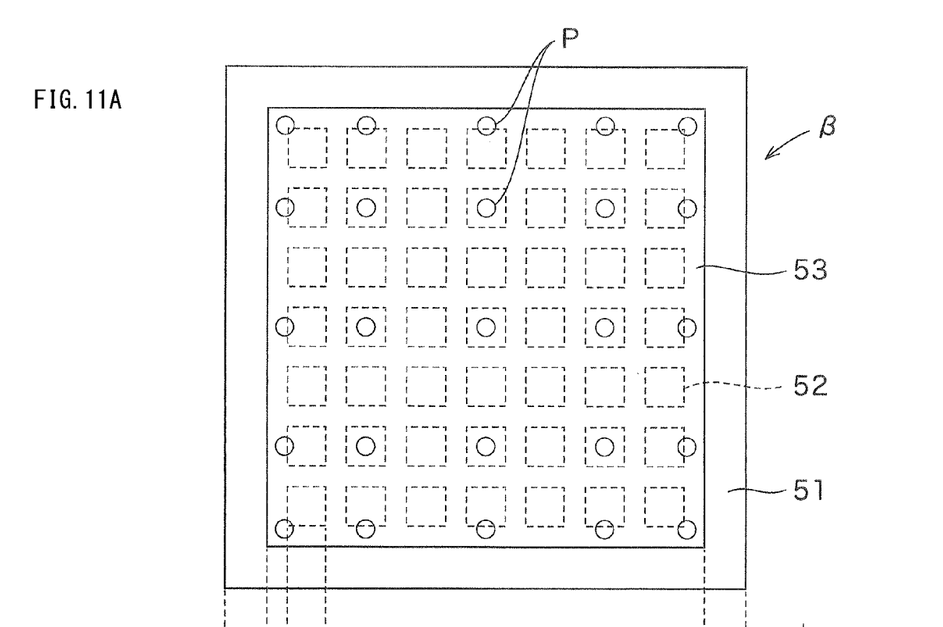
FIG. 11A is a plan view for illustrating a site at which the thickness of a laminate obtained in each of the Example and Comparative Example of the present disclosure is measured.
Figure 11B:
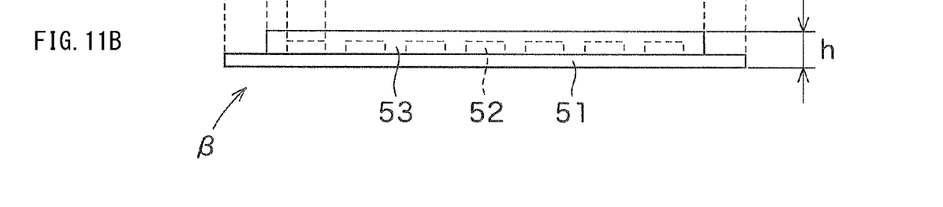
FIG. 11B is a side view thereof.

With regard to each of the laminates obtained in Example 1 and Comparative Example 1 described above, the thicknesses of portions represented by circle marks P (a total of 25 sites arranged in 5 rows by 5 columns) in the plan view of FIG. 11A were measured with a micrometer. That is, when the convex portions 52 were arranged near the end portions of the base material 51, the thickness "h" of each of the portions of the convex portions 52 near the end portions was measured, and when the convex portions 52 were arranged near the center of the base material 51, the thickness "h" of each of the top portions of the convex portions 52 was measured. The results of the measurement are shown in Tables 1 and 2 below. In Tables 1 and 2, the respective sites represented by the circle marks P are identified by using columns represented by A to E from left to right, and rows represented by 1 to 5 from top to bottom. In addition, a variation in thickness is shown as a difference between the maximum and the minimum in each row or column.

TABLE 1

| | | | | | | | (mm) |
|---|---|---|---|---|---|---|---|
| | A | B | C | D | E | Average | Variation |
| 1 | 2.390 | 2.393 | 2.389 | 2.389 | 2.383 | 2.389 | 0.010 |
| 2 | 2.391 | 2.396 | 2.397 | 2.391 | 2.387 | 2.392 | 0.010 |
| 3 | 2.393 | 2.394 | 2.398 | 2.393 | 2.390 | 2.394 | 0.008 |
| 4 | 2.391 | 2.389 | 2.394 | 2.391 | 2.386 | 2.390 | 0.008 |
| 5 | 2.382 | 2.384 | 2.390 | 2.389 | 2.382 | 2.385 | 0.008 |
| Average | 2.389 | 2.391 | 2.394 | 2.391 | 2.386 | 2.390 | |
| Variation | 0.011 | 0.012 | 0.009 | 0.004 | 0.008 | | 0.009 |

The average of the thicknesses of Example 1 was 2.390 mm, and the average of the variations thereof was 0.009 mm.

TABLE 2

|   | A | B | C | D | E | Average | Variation (mm) |
|---|---|---|---|---|---|---------|-----------|
| 1 | 2.336 | 2.334 | 2.341 | 2.335 | 2.323 | 2.334 | 0.018 |
| 2 | 2.331 | 2.359 | 2.355 | 2.345 | 2.333 | 2.345 | 0.028 |
| 3 | 2.344 | 2.361 | 2.360 | 2.348 | 2.337 | 2.350 | 0.024 |
| 4 | 2.336 | 2.360 | 2.359 | 2.345 | 2.329 | 2.346 | 0.031 |
| 5 | 2.336 | 2.345 | 2.347 | 2.332 | 2.326 | 2.337 | 0.021 |
| Average | 2.337 | 2.352 | 2.352 | 2.341 | 2.330 | 2.342 | |
| Variation | 0.013 | 0.027 | 0.019 | 0.016 | 0.014 | | 0.021 |

The average of the thicknesses of Comparative Example 1 was 2.342 mm, and the average of the variations thereof was 0.021 mm.

As shown in Tables 1 and 2 above, while in the laminate β of Example 1, the average of the thickness variations was 0.009 mm, which was an extremely small value, in the laminate of Comparative Example 1, the average of the thickness variations was 0.021 mm, that is, a variation twice or more as large as that of Example 1 was observed. Accordingly, it was found that the laminating apparatus according to at least one embodiment of the present disclosure was able to make more uniform the thickness of the laminate to be obtained including the very edge portions thereof, and was hence able to improve the yield of the product.

Although specific embodiments of the present disclosure have been described in Examples above, Examples are for illustrative purposes only and are not to be construed as limitative. It is intended that various modifications apparent to a person skilled in the art fall within the scope of the present disclosure.

The laminating apparatus according to at least one embodiment of the present disclosure can improve the uniformity of the thickness of a laminate to be obtained, and as a result, can improve the yield of the product (laminate). Accordingly, the apparatus is suitable for the production of a product (laminate) in which the control of a finished thickness is required, such as a build-up substrate or a substrate mounted with a light-emitting element, such as a LED.

The invention claimed is:

1. A laminating apparatus, comprising:
    a pressing device configured to press a base material and a film, the pressing device including
        a first press block that is advanceable and retreatable,
        a second press block arranged to face the first press block,
        a first pressing rubber mounted inside the first press block, and
        a second pressing rubber mounted inside the second press block,
    wherein the first pressing rubber and the second pressing rubber face each other,
    wherein the first pressing rubber has a convex frame formed in a peripheral edge portion of a surface thereof facing the second pressing rubber,
    wherein the first pressing rubber is present at all positions within the convex frame, and
    wherein the convex frame is present when the apparatus is in an unpressed state.

2. The laminating apparatus according to claim 1, wherein the second pressing rubber has a convex frame formed in a peripheral edge portion of a surface thereof facing the first pressing rubber.

3. The laminating apparatus according to claim 2, wherein the convex frame of the first pressing rubber and the convex frame of the second pressing rubber are configured to be brought into abutment with each other via the base material.

4. The laminating apparatus according to claim 1, wherein the pressing device further includes a first heat source capable of heating the first press block.

5. The laminating apparatus according to claim 1, wherein the pressing device further includes a second heat source capable of heating the second press block.

* * * * *